United States Patent
Sanivsky et al.

(10) Patent No.: US 10,237,147 B2
(45) Date of Patent: Mar. 19, 2019

(54) HEURISTIC NETWORK TRAFFIC CLASSIFICATION USING BYTE-DISTRIBUTIONS

(71) Applicant: MARVELL WORLD TRADE LTD., St. Michael (BB)

(72) Inventors: Ievgeny Sanivsky, Tel-Aviv (IL); Timor Kardashov, Kyriat Ono (IL); Anatoli Plotnikov, Wollstonecraft (AU)

(73) Assignee: Marvell World Trade Ltd., St. Michael (BB)

( * ) Notice: Subject to any disclaimer, the term of this patent is extended or adjusted under 35 U.S.C. 154(b) by 579 days.

(21) Appl. No.: 14/275,332

(22) Filed: May 12, 2014

(65) Prior Publication Data

US 2014/0334321 A1 Nov. 13, 2014

Related U.S. Application Data

(60) Provisional application No. 61/822,777, filed on May 13, 2013.

(51) Int. Cl.
*H04L 12/28* (2006.01)
*H04L 12/26* (2006.01)
*H04L 12/851* (2013.01)
*H04L 12/823* (2013.01)

(52) U.S. Cl.
CPC .......... *H04L 43/02* (2013.01); *H04L 47/2441* (2013.01); *H04L 47/32* (2013.01)

(58) Field of Classification Search
CPC ..... H04L 47/22; H04L 47/2441; H04L 47/32; H04L 47/36
USPC .......................... 370/431, 462–467, 472, 476
See application file for complete search history.

(56) References Cited

U.S. PATENT DOCUMENTS

| | | | | |
|---|---|---|---|---|
| 6,098,100 | A * | 8/2000 | Wey | G06F 13/385 370/324 |
| 6,697,383 | B1 * | 2/2004 | Li | H04L 7/042 370/472 |
| 7,027,465 | B2 * | 4/2006 | Hautala | H04L 69/22 370/350 |
| 7,428,215 | B2 * | 9/2008 | Kim | H04N 21/23611 370/229 |
| 7,577,736 | B1 * | 8/2009 | Ovenden | H04L 12/14 370/229 |
| 8,265,139 | B2 * | 9/2012 | Verbrugge | H04N 21/23608 375/130 |

(Continued)

FOREIGN PATENT DOCUMENTS

CN 102938764 A 2/2013

OTHER PUBLICATIONS

Office Action in Chinese Patent Application No. 201410201571.1, dated Feb. 23, 2018, with English translation (8 pages).

(Continued)

*Primary Examiner* — Dmitry H Levitan

(57) ABSTRACT

A network device has counters that are configured to generate for a plurality of byte positions in a specified portion of data packets, a count indicative of a correspondence of a value found at the byte position corresponding to a rule such that occurrences of predetermined byte values in the plurality of byte positions may be counted. A packet classifier is configured to receive from the counters a number of byte values corresponding to the rules and to classify data packets based on the analysis.

14 Claims, 16 Drawing Sheets

(56) References Cited

U.S. PATENT DOCUMENTS

| | | | |
|---|---|---|---|
| 8,374,986 B2* | 2/2013 | Indeck | G06N 5/025 370/329 |
| 8,848,834 B2* | 9/2014 | Chavali | H04L 5/0007 375/316 |
| 2013/0061099 A1* | 3/2013 | Radulescu | H04L 1/1858 714/708 |

OTHER PUBLICATIONS

Search Report in Chinese Patent Application No. 201410201571.1, mailed with Office Action dated Feb. 23, 2018 (1 page).
Office Action in Chinese Patent Application No. 201410201571.1, dated Nov. 5, 2018, with English translation (5 pages).

* cited by examiner

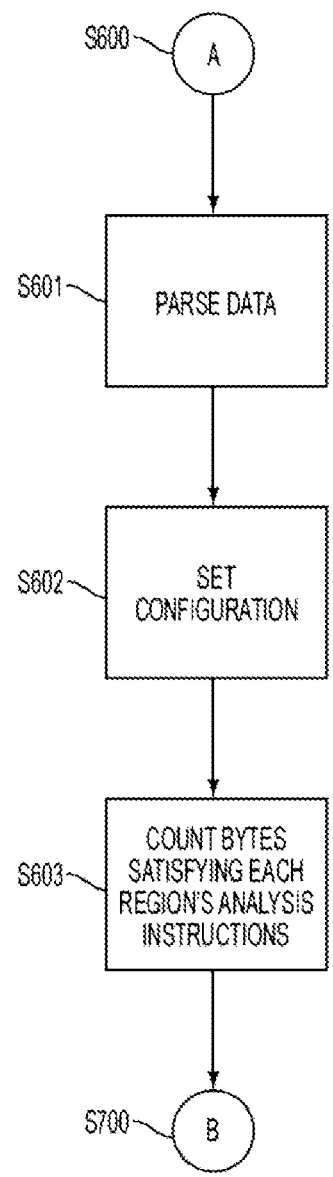

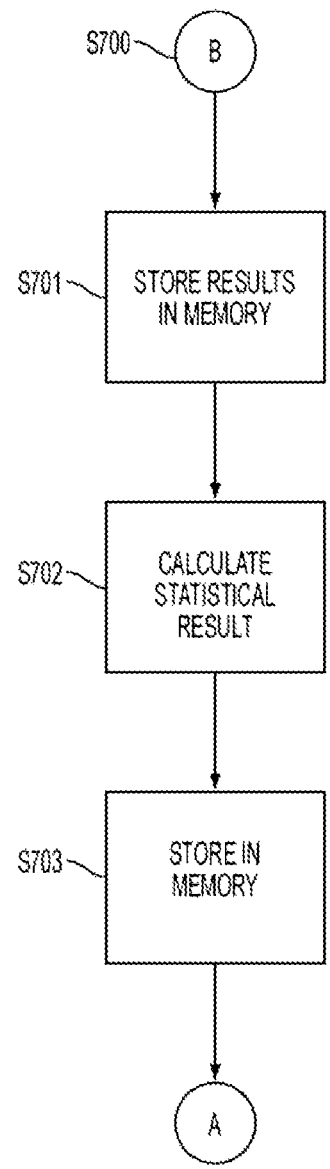

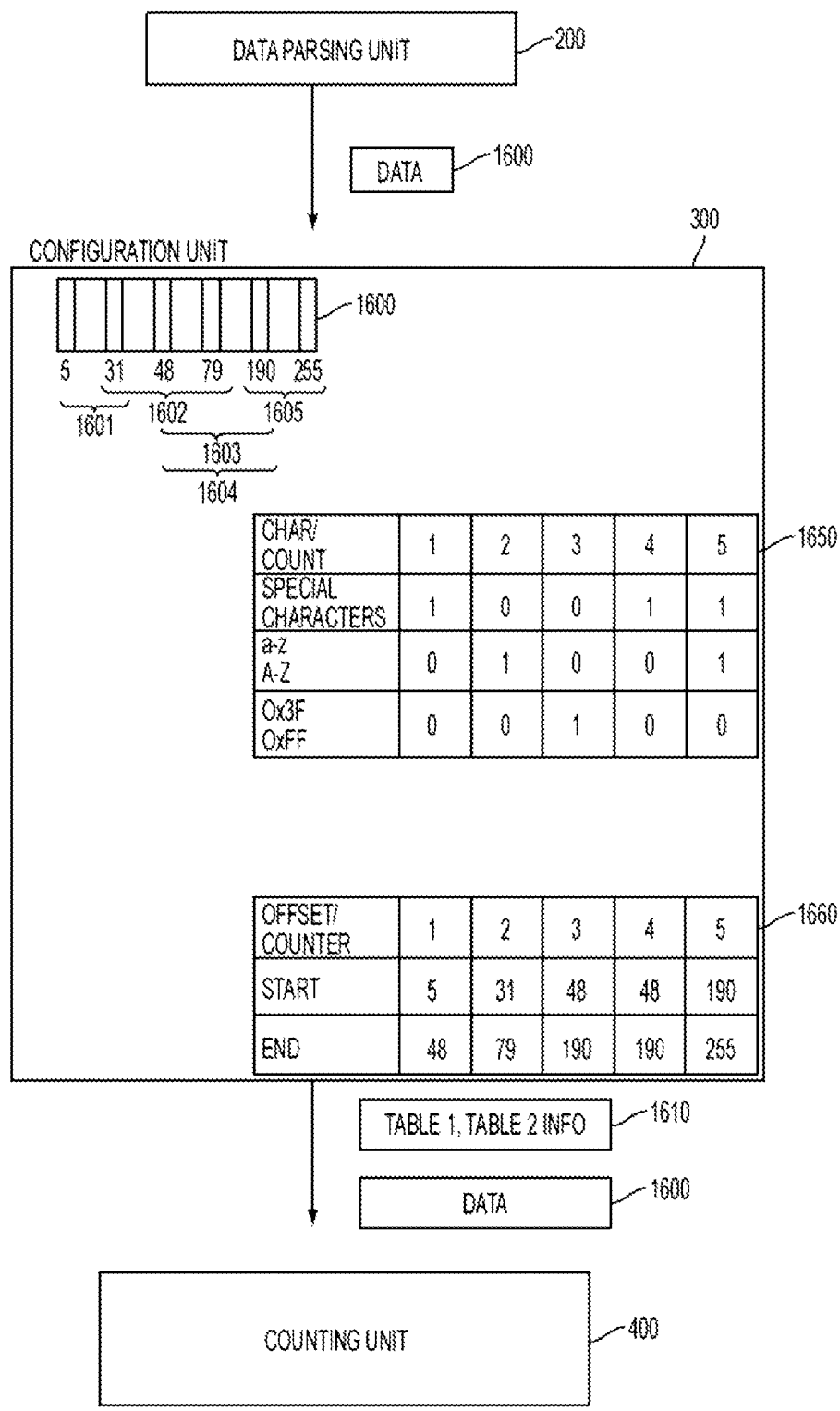

ic Network TRAFFIC
HEURISTIC NETWORK TRAFFIC CLASSIFICATION USING BYTE-DISTRIBUTIONS

CROSS-REFERENCE TO RELATED APPLICATION

This application claims priority to and the benefit of U.S. Provisional Patent Application Ser. No. 61/822,777 filed May 13, 2013 the disclosure of which is incorporated by reference herein in its entirety.

BACKGROUND

The present disclosure relates to a network device that processes packets.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Network traffic classification conventionally is based on content matching whereby matching patterns of bytes from a bitstream is correlated to matching bitstream-contents. However, conventional methodologies for classification typically require elaborate and expensive classification engines and can be overly time consuming for some applications.

SUMMARY

One or more example embodiments of the disclosure generally relate to systems and methodologies for the classification of network traffic. A packet ingress is configured to receive data packets from a network. The packet ingress employs a plurality of counters. Various ones of the counters are configured to generate, for a plurality of byte positions in a specified portion of the data packets, a count indicative of occurrences of predetermined byte values, in the plurality of byte positions. A packet classifier is configured to receive from the counters the counts of occurrences of the byte values, and to classify the data packets at least based in part on the received counts.

BRIEF DESCRIPTION OF THE DRAWINGS

FIG. 6 is a flow diagram of an example method of a configuration and counting operation of the traffic classification device of FIGS. 1-5 according to example embodiments.

FIG. 7 is a flow diagram of an example method of a classification operation of the traffic classification device of FIGS. 1-5 according to example embodiments.

FIG. 16 shows a data parsing unit, a configuration unit with configuration tables regarding the data of FIG. 14, and a counting unit according to example embodiments.

DETAILED DESCRIPTION

In the following discussion, descriptions of well-known functions and constructions are omitted for increased clarity and conciseness.

Figure 1:
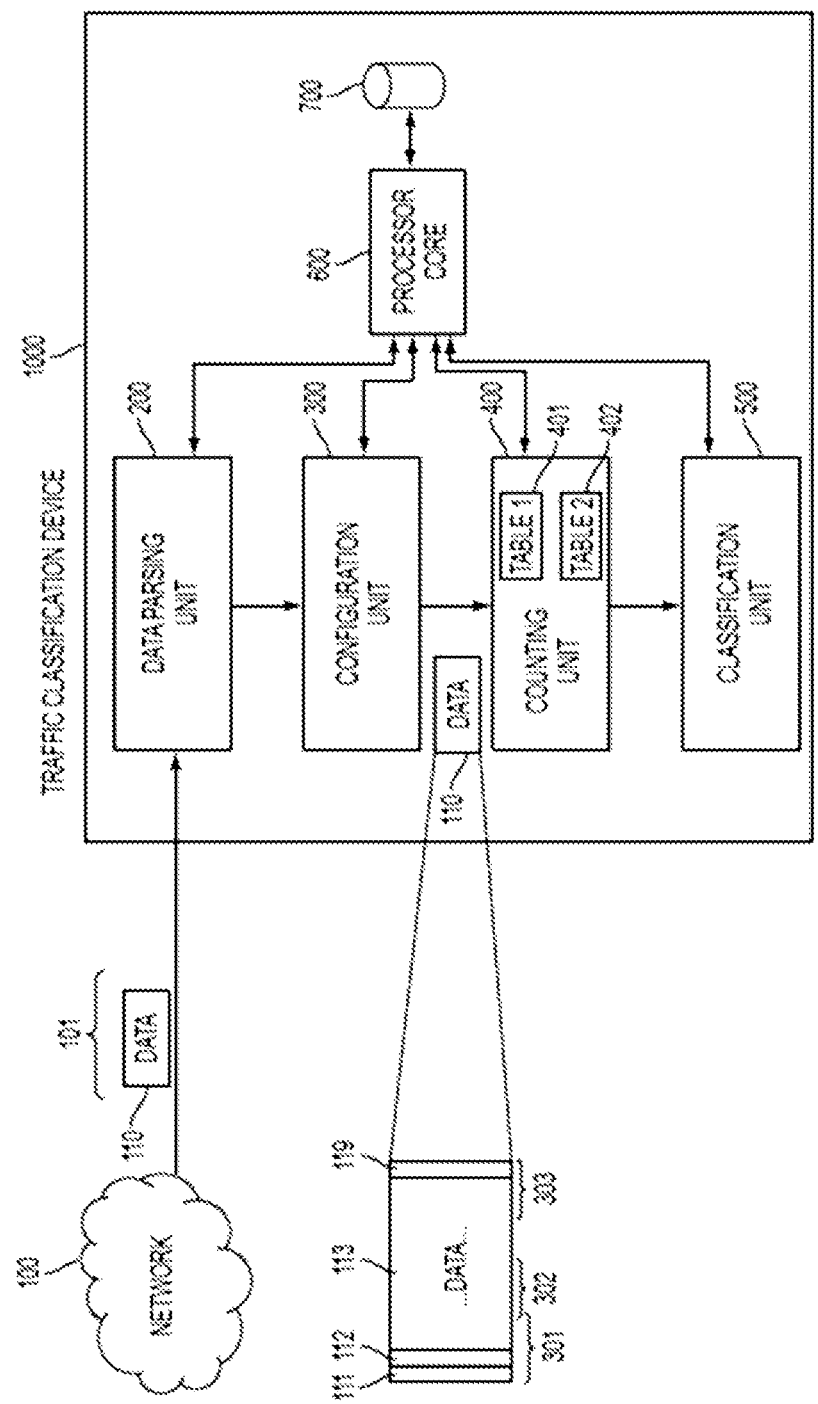
FIG. 1 shows a network device according to example embodiments.

FIG. 1 shows network 100, network traffic 101, and traffic classification device 1000. The network traffic 101 includes data 110. The traffic classification device 1000 is an example of any of a network switch, bridge, router or the like and includes a data parsing unit 200, a configuration unit 300, a counting unit 400, a classification unit 500, a processor core 600, and a memory 700. The counting unit 400 further includes a table 401 and a table 402, in an embodiment. The components of traffic classification device 1000 are arranged in the manner seen in FIG. 1 in an example embodiment.

Each of the data parsing unit 200, configuration unit 300, counting unit 400, classification unit 500, and memory 700 are communicatively coupled to the processor core 600, in an embodiment.

According to an example embodiment, the network traffic 101 is related to a single network session, however, according to another example embodiment, the network traffic 101 is related to multiple network sessions.

The data 110 of the network traffic 101 contains a first byte location 111, a second byte location 112, intermediate byte locations 113, and a last byte location 119. The locations and corresponding values of the bytes of the data 110 are analyzed by the traffic classification device 1000 to discover characteristics of an application which is to use the data being analyzed, since the traffic classification device 1000 is intermediary between the network and some application.

The data parsing unit 200 of the traffic classification device 1000 is connected to a stream of network traffic 101 from the network 100. The data parsing unit 200 receives data 110 of the network traffic 101 from the network 100. The data parsing unit 200 parses the data 110, which in an example embodiment is a data packet, to analyze properties of the data, such as a number of byte locations and types of data within the packet, and sends the parsed data to the configuration unit 300.

The configuration unit 300 sets intervals of byte locations along the data 110, such as first interval 301, second interval 302, and third interval 303. Each interval refers to a number of contiguous byte locations within a region of the data 110 by which the counting unit 400 will analyze and classify the data 110. The configuration unit 300 also designates respective analysis instructions for each region. The analysis instructions update the counting unit 400 and instruct the counting unit 400 to increment a counter when a value of a byte location matches the description contained in the instruction. According to a non-limiting example embodiment, an analysis instruction causes a search for matching ASCII-type character-bytes, and the counting unit 400 increments a counter for each byte location within the respective region that is determined to correspond to any ASCII character. The counting unit 400, which is concretely implemented in an embodiment as a hardware component or a set of hardware components, makes such a determination. The configuration unit 300 sends the data 110 with the set intervals and analysis instructions to the counting unit 400.

Although the configuration unit 300 is depicted in FIG. 1 as setting only three intervals, this is merely an example embodiment; the illustrated orientation of the intervals is also an example embodiment and any combination and ordering of intervals among the data is analyzed, according to example embodiments. The configuration unit 300 is configured to set more than or less than three intervals in relation to any data or plurality of data packets, in an embodiment.

The counting unit 400 contains one or more tables, for example table 401 and table 402, which respectively contain information regarding the analysis instructions set by the configuration unit 300. The counting unit 400 increments, or counts, the occurrences of byte locations with values corresponding to the analysis instructions for each respective interval, in an embodiment.

The first byte location 111 in the example embodiment shown in FIG. 1 is located within the first interval 301, and the counting unit 400 increments a counter when the contents of first byte location 111 matches the characteristics of the analysis instruction for interval 301. The counting unit 400 checks each byte location of the interval 301 against the respective analysis instruction which, in an example embodiment, is also stored by the table 401 and table 402. The operations of counting unit 400 result in a set of session attributes, related to the analysis instructions set by the configuration unit 300.

According to an example embodiment, the counting unit 400 stores results of the counting in the memory 700. According to an example embodiment, the results are passed to the classification unit 500 by the counting unit 400, however, according to another example embodiment, the classification unit 500 obtains the results from the memory 700.

The classification unit 500 performs a machine learning operation to classify at least one network session based on the data attributes collected and determined by the counting unit 400. According to an example embodiment, the data attributes are stored in the memory 700. A classified network session, classified as a result of the statistical analysis, is given a quality of service level based on the classification. According to an example embodiment, when the network session is determined to be transmitting data for certain applications, such as a non-business related media streaming application of the Open Systems Interconnection (OSI) model Layer 7, the quality of service for such session is set to be lower in comparison to that of a network session determined to be for business related applications, such as stock brokerage transaction orders.

Figure 2:
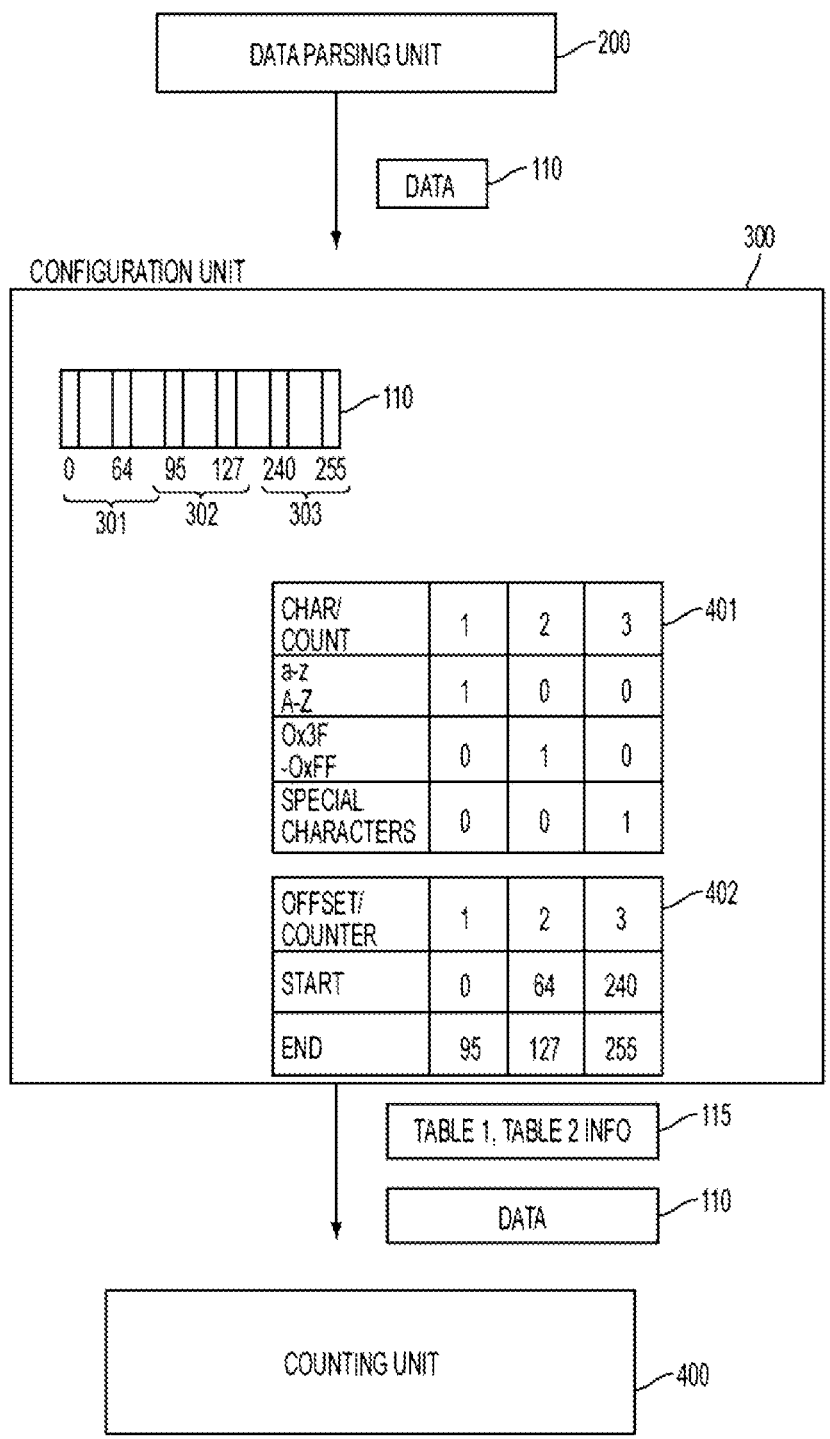
FIG. 2 shows a data parsing unit, a configuration unit with configuration tables regarding the data of FIG. 1, and a counting unit according to example embodiments.

FIG. 2 shows the data 110, the data parsing unit 200, the configuration unit 300, the table information 115 and the counting unit 400. The configuration unit 300 illustrates a distribution of the data 110 into a first interval 301, a second interval 302, and a third interval 303; this is merely an example embodiment and greater or fewer intervals are included according to other example embodiments.

According to a non-limiting example embodiment, data 110 contains two-hundred and fifty six byte locations, as denoted by the subscripts 0, 64, 95, 127, 240, and 255. The first interval 301 begins with the first byte location, denoted 0, of the data 110 and ends with the ninety sixth byte location, denoted 95. The second interval 302 begins with the sixty fifth byte location, denoted 64, of the data 110 and ends with the one-hundred twenty eighth byte location, denoted 127. The third interval 303 begins with the two-hundred and forty first byte location, denoted 240, of the data 110 and ends with the last byte location, denoted 255. These intervals are configurable and any number of bytes or byte locations, at any position within the data 110, is analyzed according to example embodiments.

The configuration unit 300 populates the table 401 and the table 402 according to analysis instructions. The table 401 and the table 402 are illustrated in the configuration unit 300, but this is merely an example embodiment. The table 401 and the table 402 are configuration settings used by the counting unit 400, and these configuration settings are passed by the data info 115. According to the example embodiment illustrated by FIG. 2, the table 401 contains three rules respectively related to the three intervals denoting the data 110; however the number and type of rules is configurable. Each rule in table 401 is represented by a number, for simplicity of explanation, and so the table may be understood to include rule 1, rule 2, and rule 3. Each rule is related to an interval of byte locations of data, and the table 401 illustrates a positive relationship between the rule and the region by the number "1."

The configuration unit 300 gives the analysis instruction for a search of the first interval 301 for any byte matching or corresponding to the ASCII characters "a-z" and "A-Z" (rule 1). The configuration unit 300 gives the analysis instruction for a search of the second interval 302 for any byte or byte location matching or corresponding to the binary equivalents of hexadecimal values "0x3F" to "0xFF" (rule 2). The configuration unit 300 gives the analysis instruction for a search of the third interval 303 for any byte matching or corresponding to the special characters ";", "/", "\", "*", "+", and "&" (rule 3). The above searches are configurable and do not limit the configuration unit 300 from defining various other analysis instructions.

The configuration unit 300 passes the table information 115 to the counting unit 400 as configuration information for analyzing the data 110; however, according to an example embodiment the counting unit 400 contains a predetermined configuration by which the data 110 is analyzed.

According to the example embodiment illustrated by FIG. 2, the table 402 contains the start offset and the end offset of the three intervals 301, 302, and 303. The start and end offsets correspond to beginning and ending bytes of the respective intervals.

According to an example embodiment, the configuration unit 300 is configured to store the data populating the table 401 and the table 402 in a memory.

Figure 3:
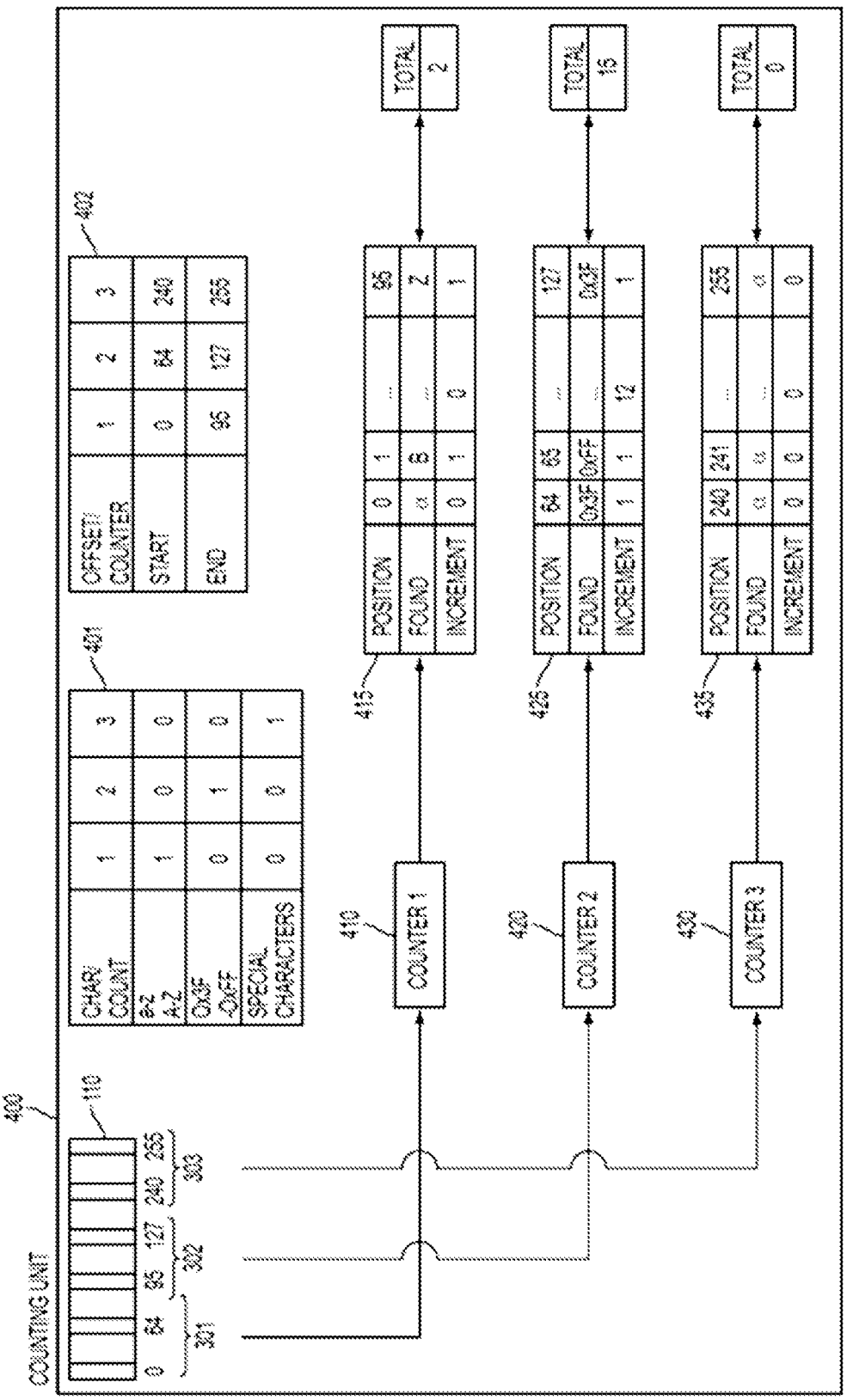
FIG. 3 shows a counting unit operating according to the configuration tables of FIG. 2 according to example embodiments.

FIG. 3 shows the counting unit 400 which includes an indication of the data 110, table 401, and table 402. The configuration settings contained by table 401 and table 402 are externally received, as discussed with respect to FIG. 2 table information 115; however, this is merely an example embodiment, and the configuration settings of the counting unit 400 are predetermined and preset according to other example embodiments. The counting unit 400 also includes counter 410, counter 420, counter 430, result table 415, result table 425, and result table 435. The counter 410 counts bytes or byte locations having values that correspond to any of the ASCII characters "a-z" and "A-Z" within the first interval 301 according to a first rule (rule 1). The counter 420 counts bytes or byte locations having values that correspond to hexadecimal values "0x3F" to "0xFF" within the second interval 302 according to a second rule (rule 2). The counter 430 counts bytes or byte locations having values that correspond to the special characters ";", "/", "\", "*", "+", and "&" within a third interval 303 according to the third rule (rule 3). Although each interval corresponds to a specific rule, this is merely an example embodiment, and one or more rules correspond to a plurality of intervals according to other example embodiments. According to an example embodiment, the counters 410, 420, and 430 operate in parallel and are hardware components.

The result tables 415, 425, and 435 illustrate a respective rule, the byte information at each location, increments, and a total count of the increments of byte locations found to be corresponding to at least one respective rule. The symbol "α" indicates that the byte does not correspond to the respective rule or analysis instruction. The result tables 415, 425, and 435 are example embodiments illustrating concepts of operation. The result tables also omit intermediate locations of the intervals for sake of illustration, and as such illustrate a total count of byte locations corresponding to at least one respective rule counted by the respective counter at the intermediate locations.

The result table 415 indicates that the counter 410 counts a total of 2 bytes whose respective values correspond to the respective rule or analysis instruction. The counter 410 counts an analogous byte at both locations 1 and 95 of the first interval 301, and therefore two bytes are counted, by the counter 410, as illustrated by the total "2" of result table 415. The remaining locations of the first interval 301 do not contain bytes analogous to the respective rule or analysis instruction.

The result table 425 indicates that the counter 420 counts a total occurrence of 15 bytes analogous to the respective rule or analysis instruction. The counter 420 counts an analogous byte at locations, 65, and 127, as well as twelve analogous bytes at the intermediate locations. Therefore, fifteen bytes are counted, by the counter 420, as illustrated by the total of result table 425. The remaining locations of the second interval 302 do not contain bytes analogous to the respective rule or analysis instruction.

The result table 435 indicates that the counter 430 counts a total of 0 bytes analogous to the respective rule or analysis instruction. The counter 430 counts no analogous bytes at any of the locations of the third interval 303. Therefore, zero bytes are counted, by the counter 430, as illustrated by the total of result table 435.

The result tables 415, 425, and 435 are merely example embodiments, and according to other example embodiments various other results are found. The data contained in the result tables 415, 425, and 435 is stored in the memory and corresponds to a configuration mode of the data 110.

Figure 4:
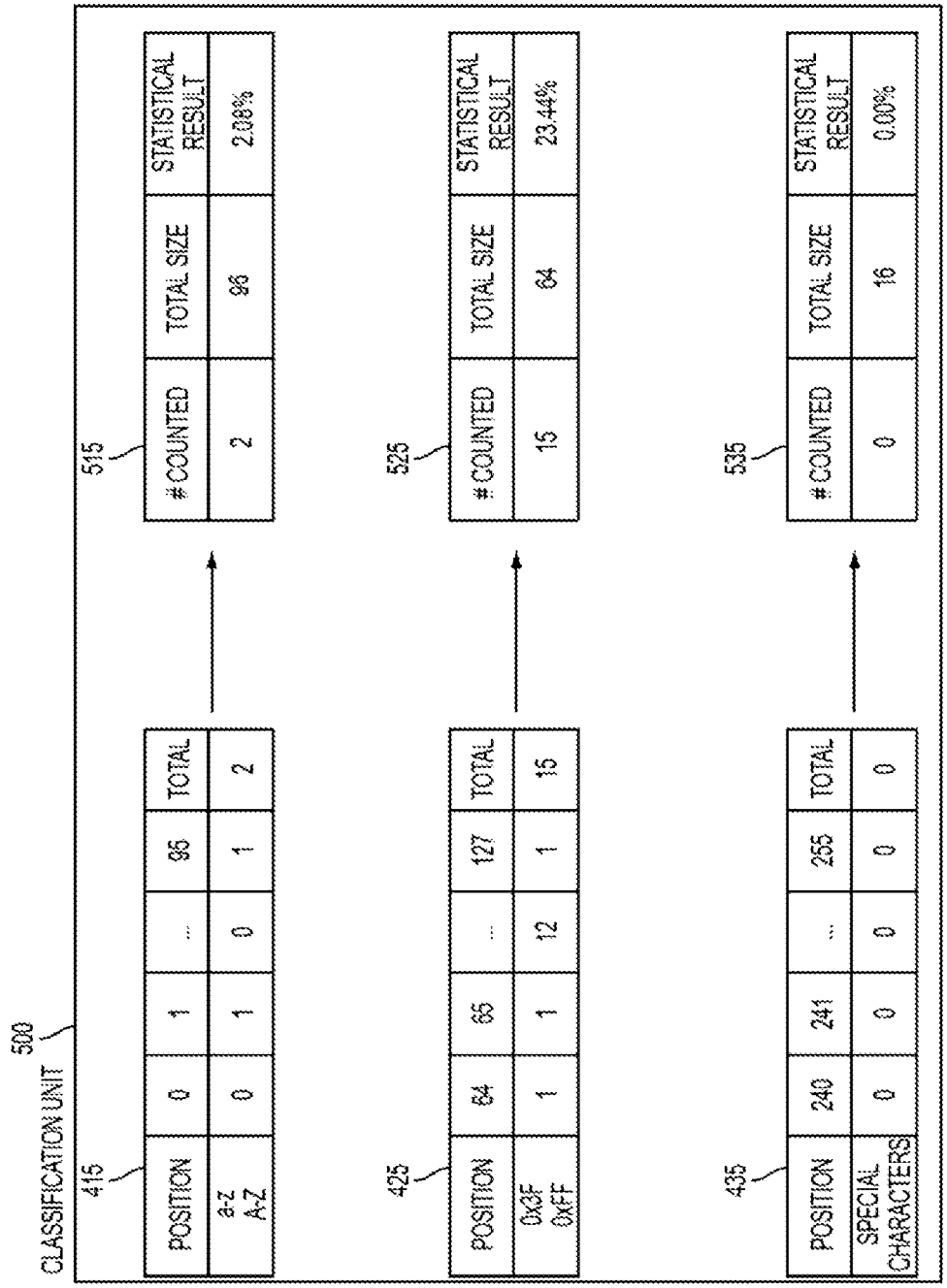
FIG. 4 shows a classification unit operating according to the results of a counting unit according to example embodiments.

FIG. 4 shows the classification unit classification unit 500, which includes the result tables 415, 425, and 435 as illustrated and received from the counting unit 400 of FIG. 3. FIG. 4 also illustrates tables 515, 525, and 535 which each respectively relate to a statistical analysis performed on the data of the result tables 415, 425, and 435.

The tables 515, 525, and 535 each illustrate a number of bytes "# Counted", a total size of an interval, and a statistical result. The number of bytes both within an interval and matching at least one rule is the total incremented value of a respective result table. The total size of an interval is the total number of bytes over which the interval of the corresponding result table is traversed. The statistical result is a percentage of the number of bytes incremented compared to the total size, or total number of bytes, of an interval.

The table 515 shows that two bytes are incremented over a total interval size of ninety six bytes. Accordingly, the size of the number of bytes incremented makes up approximately 2.08% of the total interval size. Approximate values are shown for the purposes of illustration.

The table 525 shows that fifteen occurrences of bytes both within an interval and matching at least one rule are incremented over a total interval size of sixty four bytes. Accordingly, the size of the number of bytes incremented makes up approximately 23.44% of the total interval size.

The table 535 shows that zero occurrence of bytes are incremented over a total interval size of sixteen bytes. Accordingly, the size of the number of bytes incremented makes up 0.00% of the total interval size.

The tables 515, 525, and 535 are merely example embodiments, and according to other example embodiments various other results are found. The data contained in the tables 515, 525, and 535 is stored in the memory, and according to an example embodiment, this data stored in the memory corresponds to a configuration mode.

Figure 5:
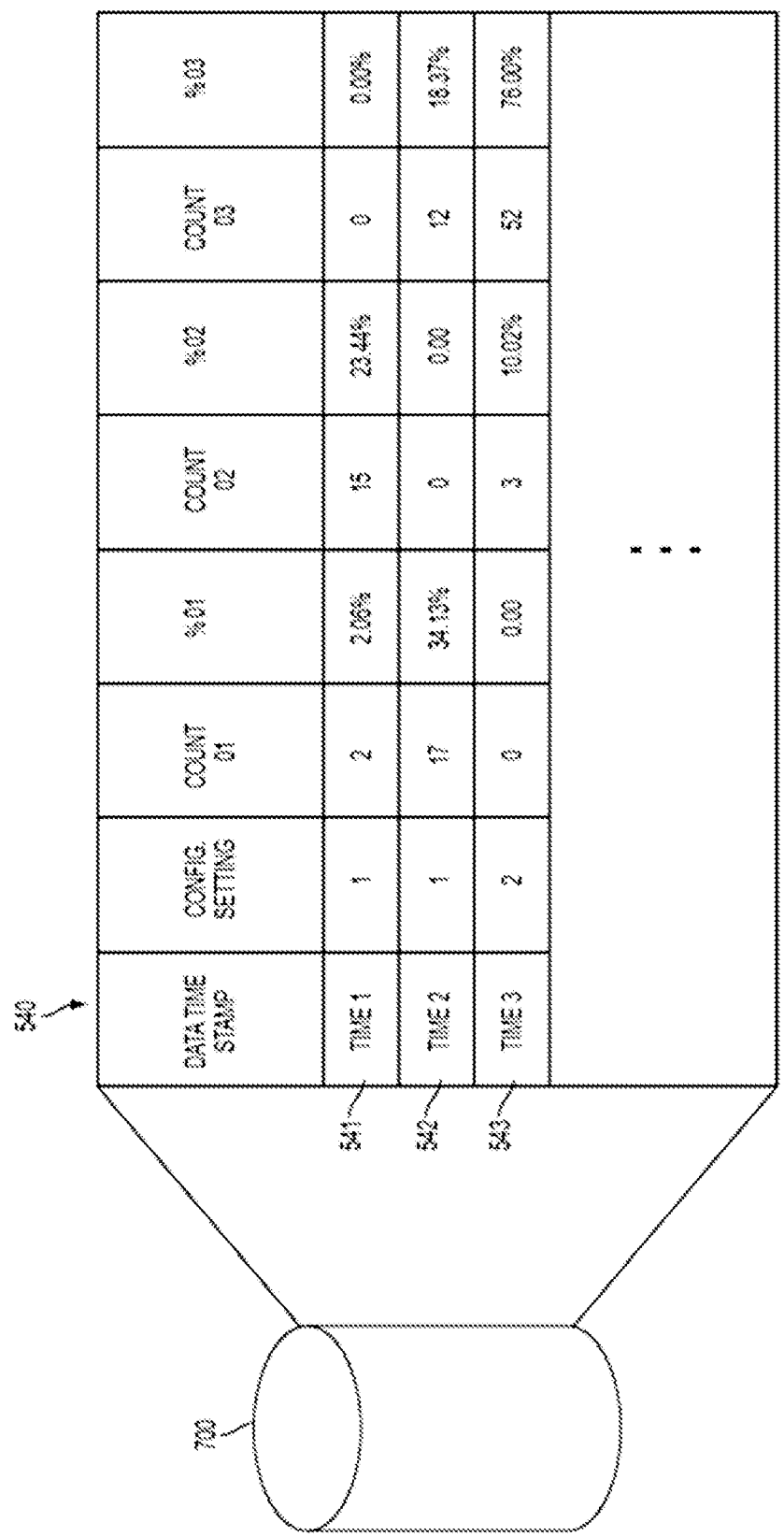
FIG. 5 shows a memory according to example embodiments.

FIG. 5 shows the memory 700 and a table 540 that is stored in memory 700. The table 540 contains data time stamps, configuration modes ("CONFIG. SETTING"), counter results, and statistical results indicative of occurrences of bytes which satisfy at least one rule within an interval of the locations for the bytes of data. The table 540 also contains rows of data 541, 542, and 543. According to an example embodiment, the data time stamp corresponds to a time at which the network session is initiated. According to another example embodiment, the data time stamp corresponds to a time at which the plurality of network sessions is initiated. According to another example embodiment, the table 540 does not contain a data time stamp. The configuration mode relates to a setting of the configuration unit.

The row of data 541 relates to the data stored in the memory as discussed with respect to FIGS. 2-4, as well as a time stamp at which the network session is initiated.

The rows of data 542 and 543 relate to additional results for additional data 110, and are presented solely for the sake of illustration. According to an example embodiment, the data of rows 542 and 543 relate to the same network session obtained at the same time, as indicated by the similar data time stamps. The configuration mode of row 543 illustrates an alternative configuration mode with respect to that of row 542, and according to an example embodiment, the alternative configuration mode yields alternative results. The alternative configuration mode indicates that different analysis instructions were configured by which a same network session is analyzed under different criteria. According to an example embodiment, the table 540 contains more than or less than the indicated number of rows, times, configuration settings, and results.

FIG. 6 is a flow diagram of an example algorithm and method, according to example embodiments, when data is received by the traffic classification device. The example method of FIG. 6 applies to multiple example embodiments wherein a traffic classification device is utilized. Processing begins at connector A, S600, as the traffic classification device receives data from at least one network session. Processing continues at S601.

At S601, the traffic classification device parses the data. Processing continues to S602.

At S602, the traffic classification device sets the configuration mode by, e.g., designating regions of the data to be analyzed and designating the analysis instructions for each interval of data. Processing then continues to S603.

At S603, the traffic classification device counts an occurrence of byte values matching a rule at a byte location within the region of interest. Processing continues via connecter B, S700, to that shown in FIG. 7.

FIG. 7 is a flow diagram of an example algorithm and method, according to example embodiments, when data is received by the traffic classification device. The example method of FIG. 7 applies to multiple example embodiments of classifying network sessions. Processing begins at connector B, S700, as the traffic classification device receives data from at least one network session. Processing continues at S701.

At S701, the traffic classification device stores the resultant count data in a memory. Processing continues to S702.

At S702, the traffic classification device calculates a statistical result based on the resultant count data. The statistical result is indicative of a percentage of bytes occurring throughout an interval which match at least one rule. Processing continues to S703.

At S703, the traffic classification device stores the resultant statistical result in the memory. Processing continues to via connector A, S600, to that shown in FIG. 6, and the next data is handled in like manner.

Figure 8A:
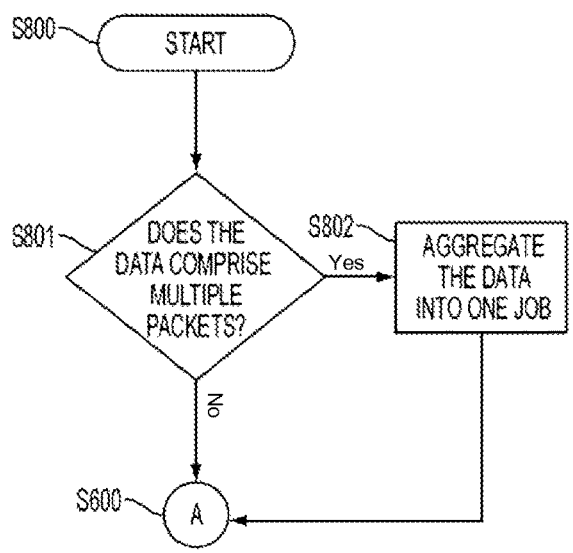
FIG. 8A is a flow diagram of an example method of a configuration of the traffic classification device of FIGS. 1-5 according to example embodiments.

FIG. 8*a* is a flow diagram of an example algorithm and method according to example embodiments when data is received by the traffic classification device. The example method of FIG. 8*a* applies to multiple example embodiments wherein a traffic classification device is utilized. Processing begins at S800 as the traffic classification device receives data from at least one network session. Processing continues at S801.

At S801, the traffic classification device determines if the data comprises multiple packets.

At S801, if the data does not comprise multiple packets, processing continues via connector A, S600.

At S801, if the data does comprise multiple packets, processing continues to S802.

At S802, the traffic classification device aggregates the multiple packets into data for a single job whereby the data of the plurality of packets is analyzed together. Processing then continues via connector A, S600 of FIG. 6 to repeat the cycle with another data.

Figure 8B:
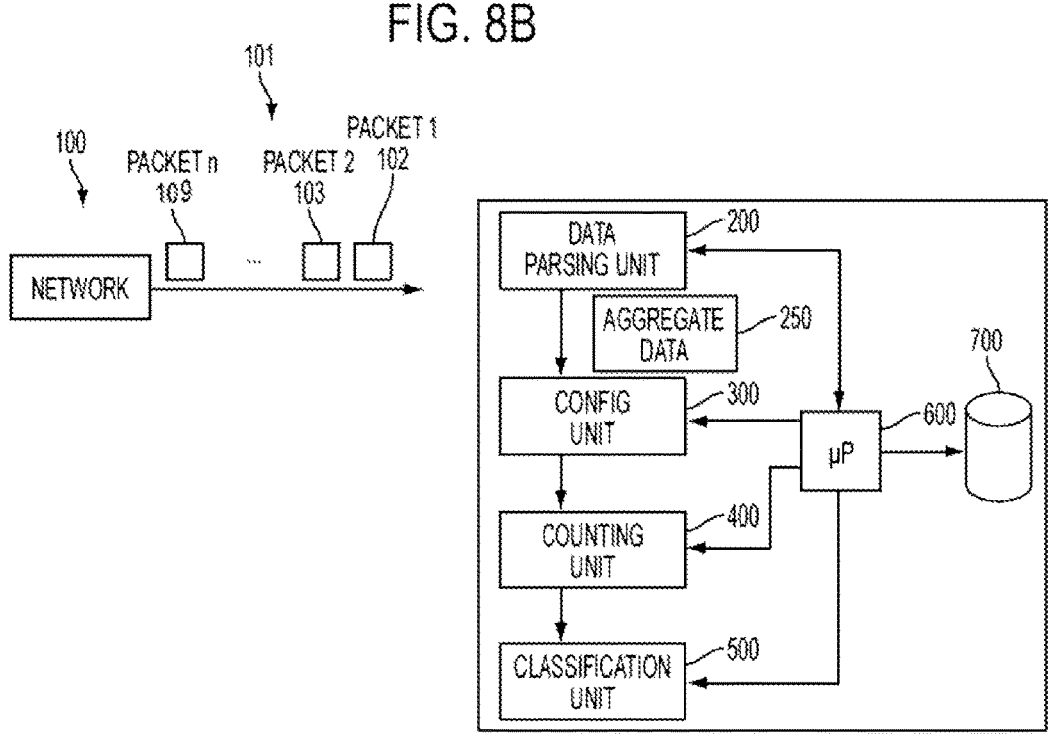
FIG. 8B shows a network device aggregating data according to example embodiments.

FIG. 8B elaborates on the just-mentioned example embodiments relating to aggregated data, and shows a traffic classification device 1000 which interfaces with a network 100, receives network traffic 101, and includes a data parsing unit 200, a configuration unit 300, a counting unit 400, a classification unit 500, a processor core 600, and a memory 700. The components of the traffic classification device 1000 are substantially similar to those discussed with respect to FIG. 1, except as noted below.

FIG. 8B shows a plurality of packets 102, 103, 109 comprising the network traffic 101. For the sake of illustration, intervening packets are omitted between packet 103 and packet 109.

The traffic classification device 1000 receives the plurality of packets 102, 103, 109 of the network traffic 101. The data parsing unit 200 aggregates the plurality of packets 102, 103, 109 into aggregate data 250. According to an example embodiment, the traffic classification device 1000 processes the aggregate data 250 in a method substantially similar to that discussed above with respect to at least FIGS. 1-5.

Figure 9:
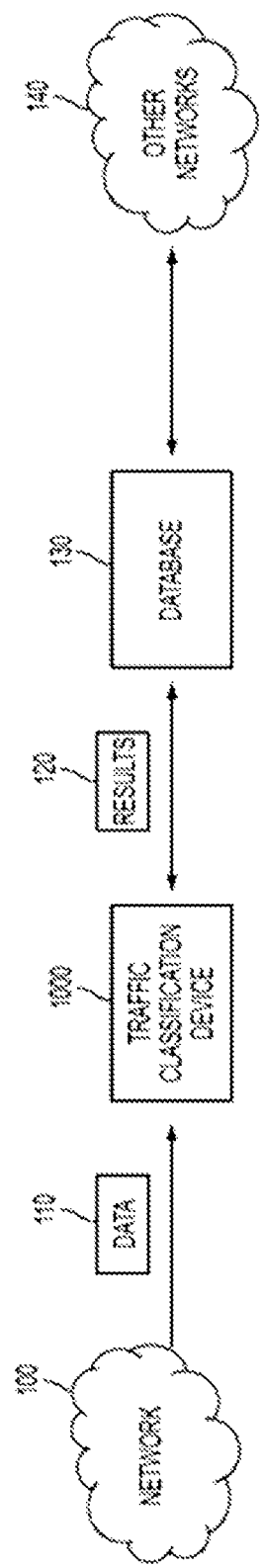
FIG. 9 shows a network device and networks according to example embodiments.

FIG. 9 shows a network 100, data 110, a traffic classification device 1000, results 120, a database 130, and other networks 140. According to an example embodiment the database 130 is connected to a plurality of other networks 140.

The traffic classification device 1000 is configured to receive and process the data of network 100 in a method substantially similar to that discussed above with respect to FIGS. 1-5. The traffic classification device 1000 is further configured to share the results of its processing, such as the total number of incremented counts with respect to an analysis instruction for a region, and the subsequent statistical result, with the database 130 and subsequently with the plurality of other networks 140. According to this example embodiment, the traffic classification device 1000 is communicatively coupled with a plurality of other networks 140.

Figure 10:
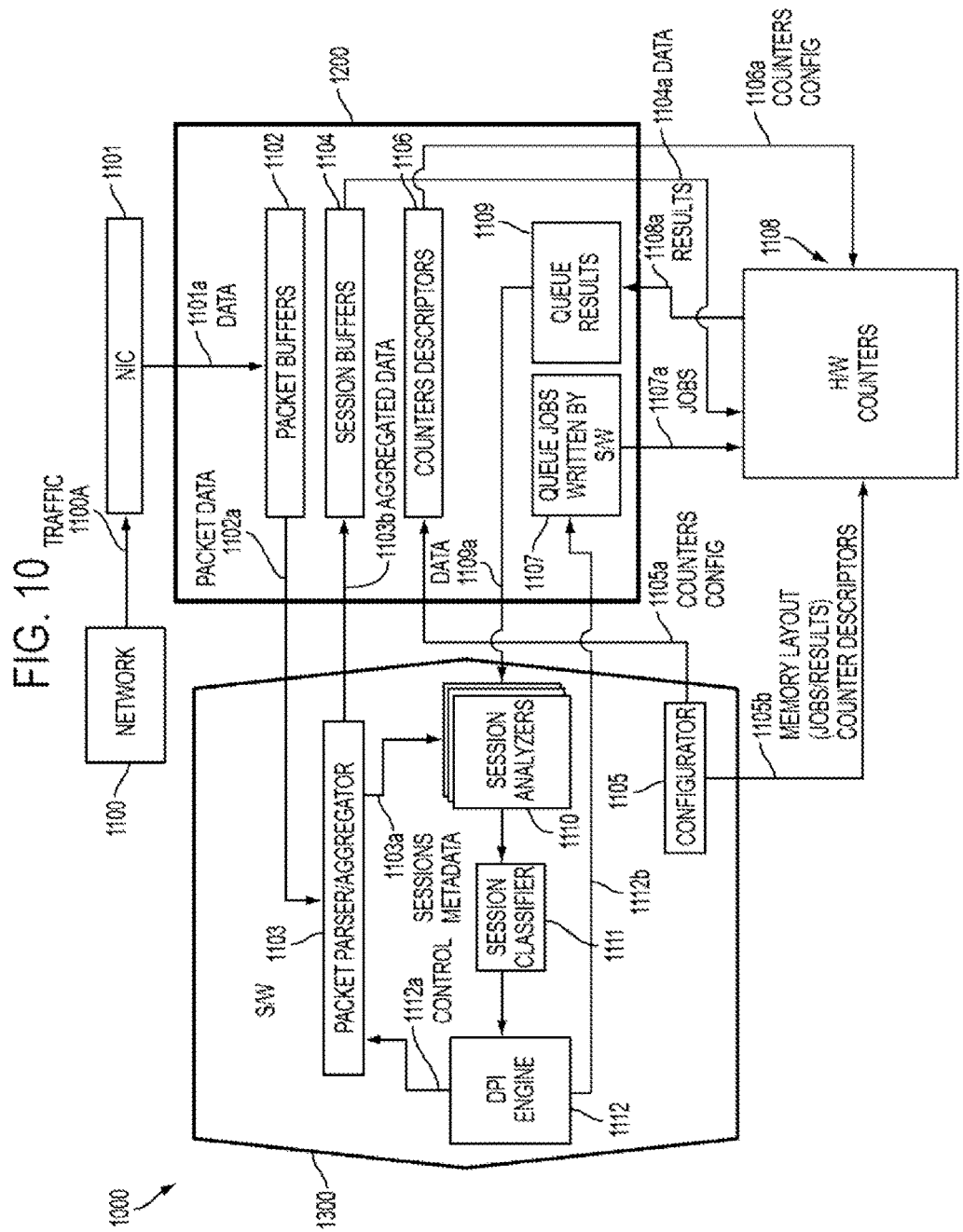
FIG. 10 shows a network device according to example embodiments.

FIG. 10 shows a traffic classification device 1000. The traffic classification device 1000 interfaces with a network 1100 via a network interface controller (NIC) 1101, and includes packet buffers 1102, a packet parser/aggregator 1103, session buffers 1104, a configurator 1105, counter descriptors unit 1106, a jobs queue 1107, hardware counters 1108, a results queue 1109, session analyzers 1110, session classifiers 1111, and a deep packet inspection (DPI) engine 1112. According to an example embodiment, the packet buffers 1102, session buffers 1104, counter descriptors 1106, jobs queue 1107, hardware counters 1108, and queue results 1109 are all implemented as hardware components. According to an example embodiment, the packet parser/aggregator 1103, configurator 1105, session analyzer, session classifier 1111, and DPI engine 1112 are all implemented as software components in a programmable processor. The hardware components collectively form hardware element 1200, and the software components form software element 1300.

The packet buffers 1102 are configured to hold a plurality of packets to be aggregated by the packet parser/aggregator 1103. The session buffers 1104 hold aggregated data 1103*b* until the hardware counter 1108 is ready to process the aggregated data 1103 based on both the jobs queue 1107 and the counters configuration data 1106*a* from the counters descriptors 1106.

The network 1100 sends network traffic 1100*a* to the NIC 1101. The NIC 1101 sends the network traffic or data 1101*a* to the packet buffers 1102. The packet buffers 1102 send packet data 1102*a* to the packet parser 1103.

The packet parser/aggregator 1103 is configured to aggregate the packet data 1102*a* based on the control signals 1112*a* sent from the DPI engine 1112.

The DPI engine 1112 is configured to receive control signals from both the session classifier 1111 and the session analyzers 1110 based on a status of the current processing as determined by the session analyzers 1110. The DPI engine is further configured to write jobs, to the jobs queue, which are to be implemented in parallel by the hardware counters 1108.

The packet parser/aggregator 1103 sends session metadata 1103*a* to the session analyzers 1110, and the packet parser/aggregator 1103 sends aggregated packet data 1103*b* to the session buffers 1104.

The configurator 1105 is configured to determine a counter configuration and send counter configuration control signals 1105*a* from the software to the counter descriptors unit 1106 of the hardware. The configurator 1105 is further configured to send to the hardware counters 1108*a* memory layout control signal 1105*b* for the jobs and results to be carried out by the hardware counters 1108.

The counters descriptors unit 1106 is configured to process the counter configuration control signals 1105*a* from the configurator 1105 and send subsequent counter configuration control signals 1106*a* to the hardware counters 1108.

The hardware counters 1108 are configured to process the jobs 1107*a* from the jobs queue 1107 when the memory layout control signal 1105*b*, data 1104*a*, and counter configuration control signals 1106*a* are received from the configurator 1105, session buffers 1104, and counters descriptors 1106 respectively. The hardware counters 1108 are configured to process the data 1104*a* in a method substantially similar to a parallelized version of the method discussed above with respect to FIG. 4 wherein the hardware counters 1108 process a plurality of jobs 1107*a* from the jobs queue 1107 respective to a plurality of sessions from the network 1100. According to an example embodiment, the plurality of sessions come from a plurality of networks.

The hardware counters 1108 are further configured to write the results 1108*a* to the results queue 1109 which then sends the results data 1109*a* to the session analyzers 1110. The session analyzers 1110 process the results queue is a fashion substantially similar to the above-identified parallelization of the hardware counters 1108. The results of the session analyzers 1110 with respect to the data 1109*a* relates to statistical results substantially similar to those discussed above with respect to FIG. 4, however, this is merely an example embodiment and other statistical analysis methods are employed according to other example embodiments.

The results of the session analyzer 1110 are sent to the session classifier 1111 for classification and further control of the DPI engine 1112. A non-limiting example algorithm and method for using the traffic classification device 1000 of FIG. 10 is discussed below with respect to FIGS. 11 and 12.

The above description of the traffic classification device 1000 with respect to FIG. 10 is merely a non-limiting example embodiment and various modifications, and permutations of the above disclosure are carried out according to other example embodiments within the scope of the present disclosure. According to an example embodiment the traffic classification device 1000 comprises only hardware components.

Figure 11:
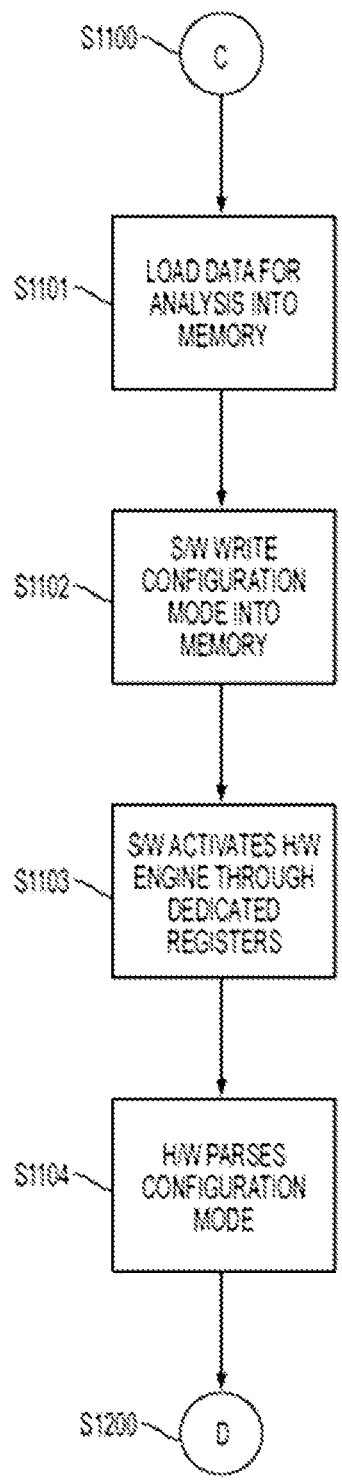
FIG. 11 is a flow diagram of an example method according to example embodiments of the loading and configuration of the network device such as in FIG. 10.

FIG. 11 is a flow diagram of an example algorithm and method, according to example embodiments, when data is received by the traffic classification device. The example method of FIG. 11 applies to multiple example embodiments wherein traffic classification device is utilized. Processing begins at connector C, S1100 as the traffic classification device receives data from at least one network session. Processing continues at S1101.

At S1101, data for analysis is loaded into a memory. The processing continues at S1102.

At S1102, the software writes a configuration mode into the memory, thereby setting the parameters for the hardware counters. The processing continues at S1103.

At S1103, the software activates the hardware engine through dedicate registers, initializing the hardware processing. The processing continues at S1104.

At S1104, the hardware parses the configuration mode from the memory. Processing continues via connector D, S1200, as shown by FIG. 12.

Figure 12:
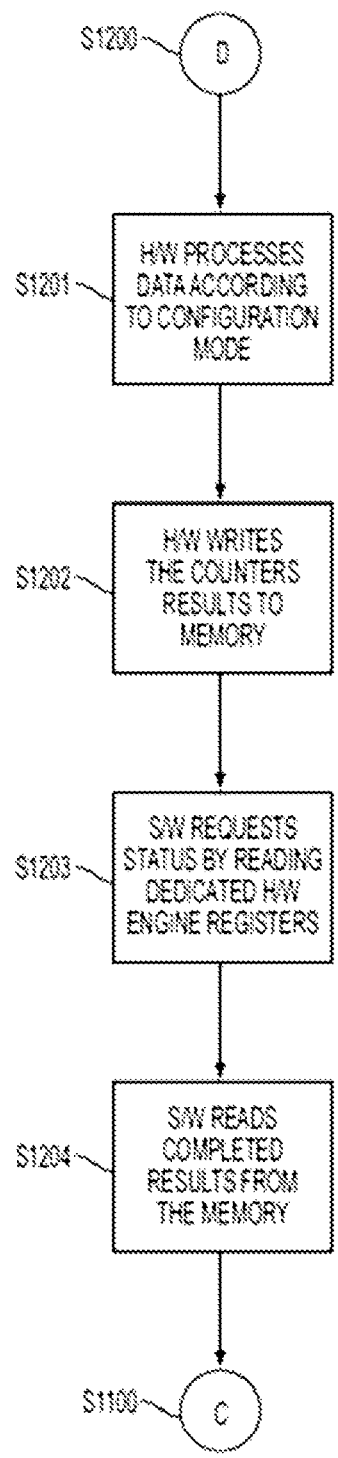
FIG. 12 is a flow diagram of an example method according to example embodiments of the loading and configuration of the network device such as in FIG. 10.

In FIG. 12, processing begins at connector D, S1200 as the hardware of the traffic classification device receives data from at least one network session. Processing continues at S1201.

At S1201, the hardware counters process the data according to the configuration mode parsed from the memory. Processing continues at S1202.

At S 1202, the hardware writes the result of the processed data, the counter results, to the memory. Processing continues at S1203.

At S1203, the software requests a status of the processing from the hardware by reading dedicated hardware engine registers. Processing continues at S1204.

At S1204, the software determines that the hardware engine registers indicate that the hardware processing is complete and the software reads the complete results from the memory. Processing continues via connector C, at S1100, to that shown in FIG. 11, and the next data is handled in like manner.

Figure 13:
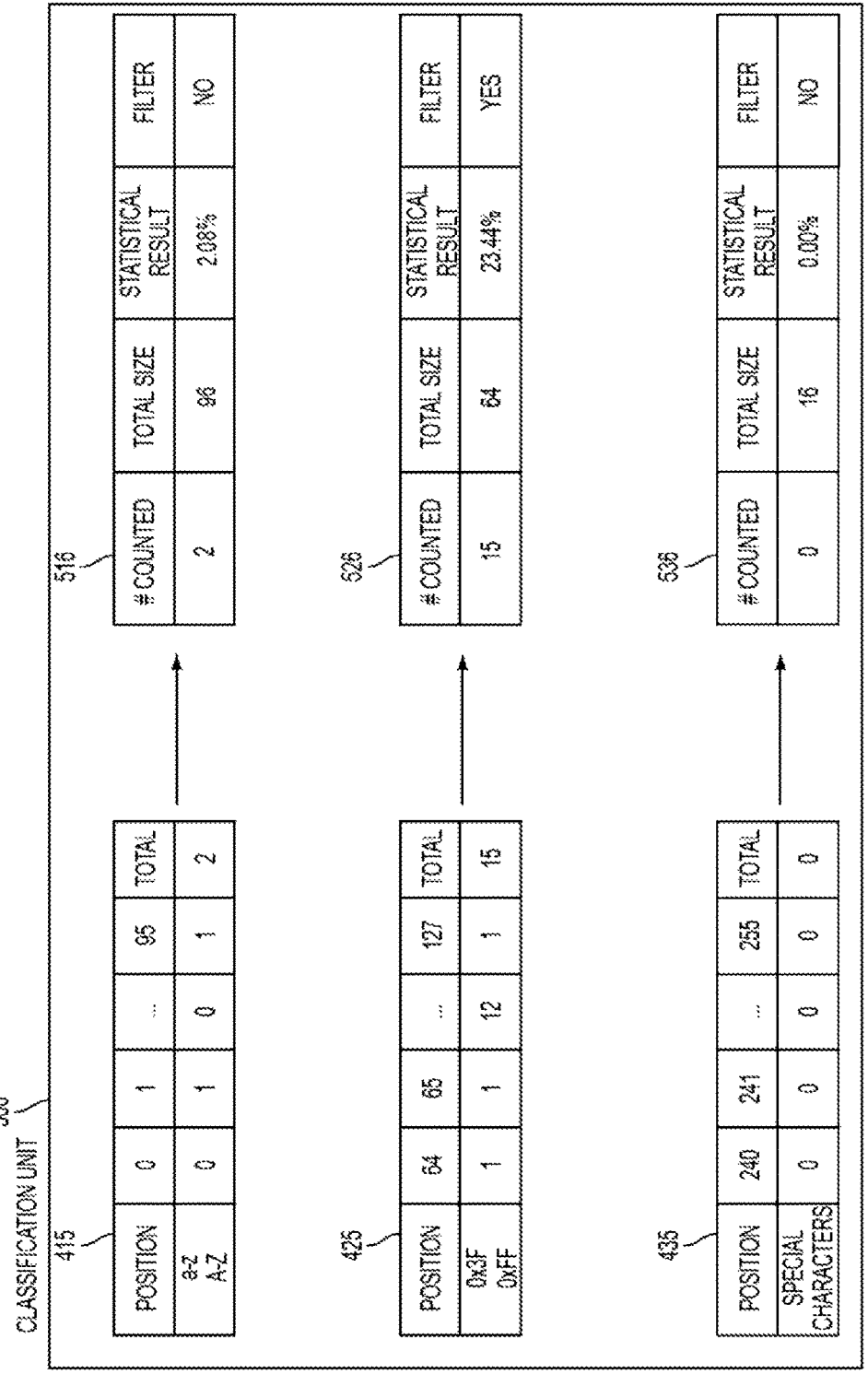
FIG. 13 shows a classification unit operating according to the results of a counting unit according to example embodiments.

FIG. 13 shows the classification unit classification unit 500, which includes the result tables 415, 425, and 435 as illustrated and received from the counting unit 400 of FIG. 3. FIG. 4 also illustrates tables 516, 526, and 536 which each respectively relate to a statistical analysis performed on the data of the result tables 415, 425, and 435.

The tables 516, 526, and 536 each illustrate a number of byte occurrences incremented, a total size of an interval, a statistical result, and an indication of whether or not the data is filtered as a result of the statistical result. The number of bytes incremented is the total incremented value of a respective result table. The total size of an interval is the total number of bytes over which the interval of the corresponding result table is traversed. The statistical result is a percentage of the number of bytes incremented compared to the total size, or total number of bytes, of an interval, in an embodiment. The filtering includes any of dropping the data or a portion of the data or otherwise not sending the data to its pre-filtered destination.

The table 516 shows that two byte occurrences are incremented over a total interval size of ninety six bytes. Accordingly, the size of the number of byte occurrences incremented makes up approximately 2.08% of the total interval size. Approximate values are shown for the purposes of illustration. The classification unit 500 determines that the data should not be filtered on the basis of the statistical result, 2.08%, which according to an example embodiment is below a predetermined, configurable threshold for filtering portions of the data.

The table 526 shows that fifteen byte occurrences are incremented over a total interval size of sixty four bytes. Accordingly, the size of the number of byte occurrences incremented makes up approximately 23.44% of the total interval size. The classification unit 500 determines that the data should be filtered.

The table 536 shows that zero byte occurrences are incremented over a total interval size of sixteen bytes. Accordingly, the size of the number of byte occurrences incremented makes up 0.00% of the total interval size. The classification unit 500 determines that the data should not be filtered.

The tables 516, 526, and 536 are merely example embodiments, and according to other example embodiments various other results are found. The data contained in the tables 516, 526, and 536 is stored in the memory, and according to an example embodiment, this data stored in the memory corresponds to a configuration mode.

Figure 14:
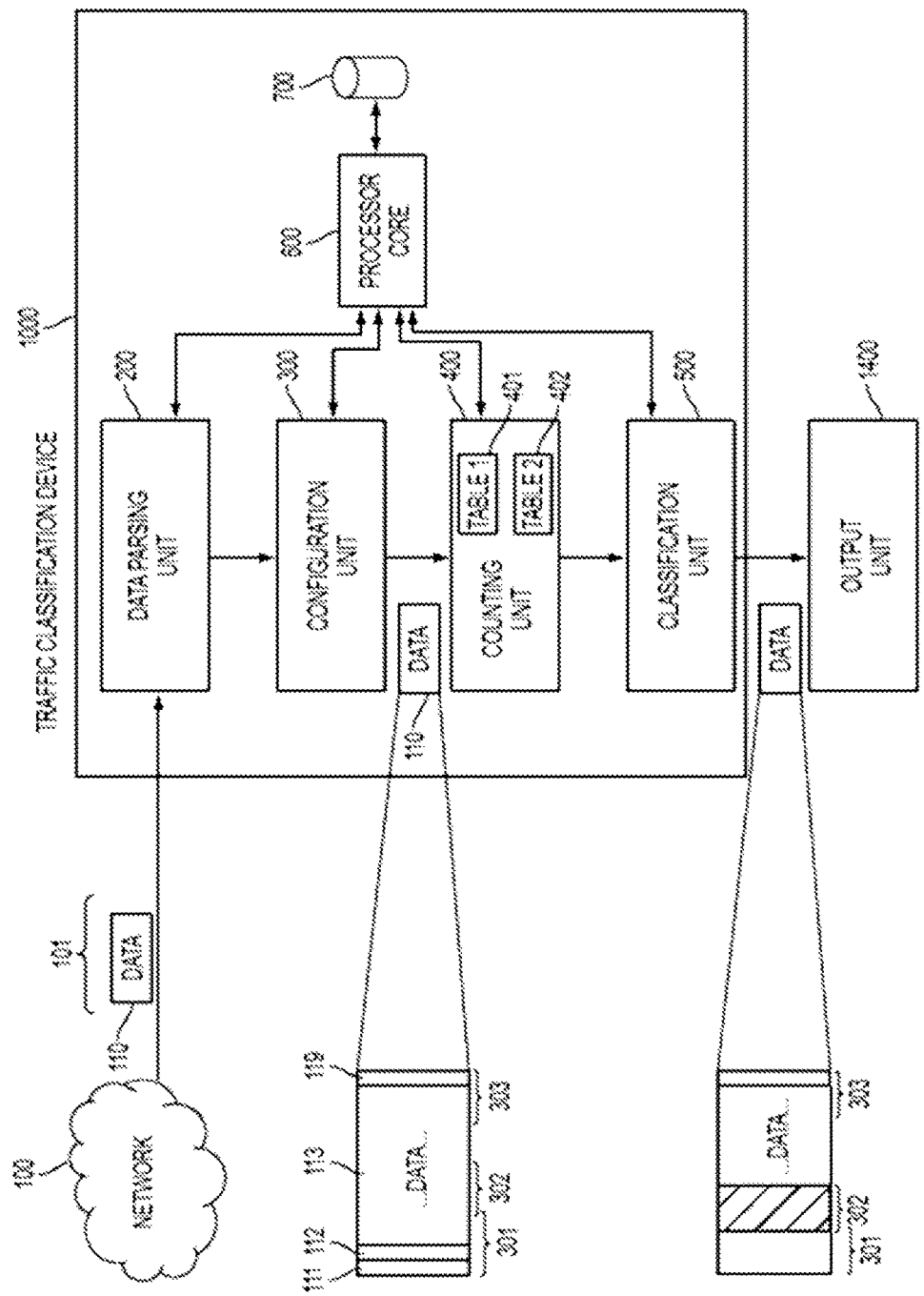
FIG. 14 shows a network device and an output unit according to example embodiments.

FIG. 14 shows a network 100, network traffic 101, traffic classification device 1000, and an output unit 1400. The network traffic 101 includes data 110. The traffic classification device 1000 includes a data parsing unit 200, a configuration unit 300, a counting unit 400, a classification unit 500, a processor core 600, and a memory 700. The counting unit 400 further includes a table 401 and a table 402. The arrangement of the elements of the traffic classification device 1000 is merely an example embodiment.

The data 110 of the network traffic 101 contains a first byte 111, a second byte 112, intermediate bytes 113, and a last byte 119. The bytes of the data 110 are analyzed by the traffic classification device 1000.

The data parsing unit 200 of the traffic classification device 1000 is connected to a stream of network traffic 101 from the network 100. The data parsing unit 200 receives data 110 of the network traffic 101 from the network 100. The data parsing unit 200 parses the data 110, a data packet, to analyze properties of the data, such as number of bytes and types of data within the packet, and sends the parsed data to the configuration unit 300.

The configuration unit 300 sets intervals of bytes along the data 110, such as first interval 301, second interval 302, and third interval 303. Each interval refers to a number of contiguous bytes within a region of the data 110 by which the counting unit 400 will analyze and classify the data 110. The configuration unit 300 also designates analysis instructions respective to each region. The analysis instructions update the counting unit 400 and instruct the counting unit 400 to increment a counter when a byte matches the description of the instruction. The configuration unit 300 sends the data 110 with the set intervals and analysis instructions to the counting unit 400.

The counting unit 400 contains a table 401 and a table 402 which respectively contain information regarding the analysis instructions set by the configuration unit 300. The counting unit 400 increments, or counts, the occurrences of bytes corresponding to the analysis instructions for each respective interval.

According to an example embodiment, the counting unit 400 stores results of the counting in the memory 700. According to an example embodiment, the results are passed to the classification unit 500 by the counting unit 400, however, according to another example embodiment, the classification unit 500 obtains the results from the memory 700.

The classification unit 500 performs a machine learning operation that is used to classify at least one network session based on the collected data attributes determined by the counting unit 400. According to an example embodiment, the data attributes are stored in the memory 700. Any of a filtering and a quality of service level is given to at least a portion of the classified network session as a result of the classification. According to an example embodiment, the interval 302 is filtered from the data by the classification unit 500 before sending the data to the output unit 1400.

Figure 15:
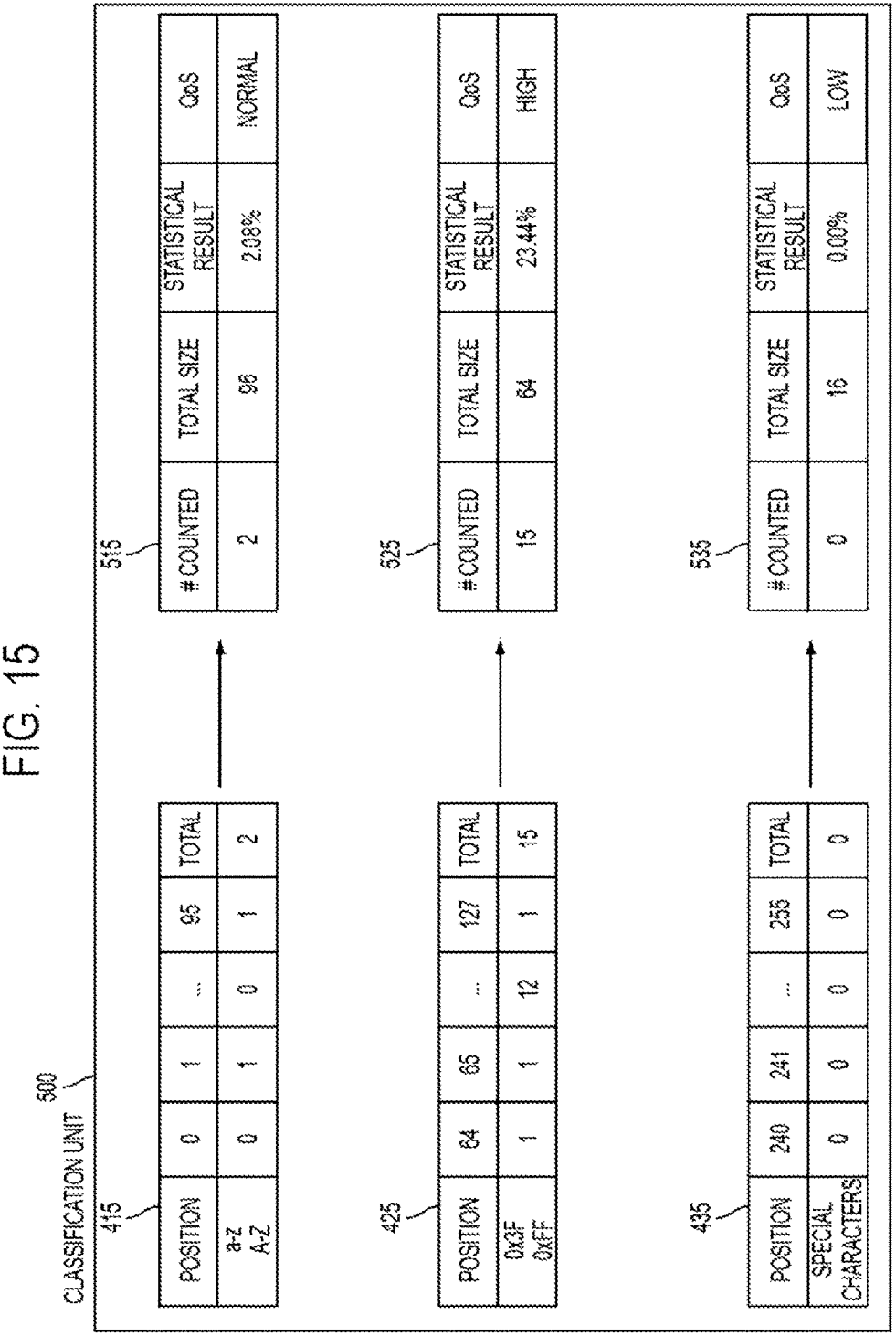
FIG. 15 shows a classification unit operating according to the results of a counting unit according to example embodiments.

FIG. 15 shows the classification unit classification unit 500, which includes the result tables 415, 425, and 435 as illustrated and received from the counting unit 400 of FIG. 3. FIG. 4 also illustrates tables 515, 525, and 535 which each respectively relate to a statistical analysis performed on the data of the result tables 415, 425, and 435.

The tables 515, 525, and 535 each illustrate a number of bytes incremented, a total size of an interval, a statistical result, and an indication of whether or not the data has a quality of service applied a result of the statistical result. The number of bytes incremented is the total incremented value of a respective result table. The total size of an interval is the total number of bytes over which the interval of the corresponding result table is traversed. The statistical result is a percentage of the number of bytes incremented compared to the total size, or total number of bytes, of an interval. The filtering is any of dropping the data, or a portion of the data, or otherwise not sending the data to its pre-filtered destination.

The table 515 shows that two bytes are incremented over a total interval size of ninety six bytes. Accordingly, the size of the number of bytes incremented makes up approximately 2.08% of the total interval size. Approximate values are shown for the purposes of illustration. The classification unit 500 determines that the data has a normal quality of service level. According to an example embodiment, the statistical result of 2.08% did not trigger any change to the quality of service level; however, other example embodiments include predetermined, configurable thresholds which would be triggered by the 2.08% statistical result and would change the quality of service level.

The table 525 shows that fifteen byte occurrences are incremented over a total interval size of sixty four bytes. Accordingly, the size of the number of bytes incremented makes up approximately 23.44% of the total interval size. The classification unit 500 determines that the data has a high quality of service level. According to an example embodiment, the statistical result of 23.44% triggers a change to the quality of service level.

The table 535 shows that zero byte occurrences are incremented over a total interval size of sixteen bytes. Accordingly, the size of the number of bytes incremented makes up 0.00% of the total interval size. The classification unit 500 determines that the data has a low quality of service level. According to an example embodiment, the statistical result of 0.00% triggers a change to the quality of service level.

The tables 515, 525, and 535 are merely example embodiments, and according to other example embodiments various other results are found. The data contained in the tables 515, 525, and 535 is stored in the memory, and according to an example embodiment, this data stored in the memory corresponds to a configuration mode. The above indicated quality of service levels are non-limiting examples of an implementation of quality of service based on the statistical results.

FIG. 16 shows the data 1600, the data parsing unit 200, the configuration unit 300, the table information 1660 and the counting unit 400. The configuration unit 300 illustrates a distribution of the data 1600 into a first interval 1601, a second interval 1602, a third interval 1603, a fourth interval 1604, and a fifth interval 1605.

According to a non-limiting example embodiment, data 1600 contains two-hundred and fifty six bytes, as denoted by the subscripts. The first interval 1601 begins with a fifth byte, denoted 5, of the data 1600 and ends with the forty eighth byte, denoted 48. The second interval 1602 begins with the thirty first byte, denoted 31, of the data 1600 and ends with the seventy ninth byte, denoted 79. The third interval 1603 begins with the forty eighth byte, denoted 48, of the data 1600 and ends with the one-hundred and ninetieth byte, denoted 190. The fourth interval 1604, completely overlaps the third interval 1603, and begins with the forty eighth byte, denoted 48, of the data 1600 and ends with the one-hundred and ninetieth byte, denoted 190. The fifth interval 1605 begins with the one-hundred and ninetieth byte, denoted 190, of the data 1600 and ends with the last byte, denoted 255. These intervals are configurable and any number of bytes at any position within the data 110 is analyzed according to example embodiments.

The configuration unit 300 populates the table 1650 and the table 1660 according to analysis instructions. According to the example embodiment illustrated by FIG. 16, the table 1650 contains three rules; however the numbers and type of rules is configurable. Each rule is related to an interval of bytes or byte locations of the data shown by table 1660, and the table 1650 illustrates a positive relationship between the rule and the region by the number "1."

The configuration unit 300 gives the analysis instruction for a search of the first interval 1601, fourth interval 1604, and fifth interval 1605 for any byte matching or corresponding to the special characters ";", "/", "\", "*", "+", and "&". The configuration unit 300 gives the analysis instruction for a search of the second interval 1602 and fifth interval 1605 for any byte matching or corresponding to the ASCII characters "a-z" and "A-Z". The configuration unit 300 gives the analysis instruction for a search of the third interval 1603 for any byte matching or corresponding to the binary values "0x3F" to "0xFF". The above searches are configurable and do not limit the configuration unit 300 from defining various other analysis instructions.

The configuration unit 300 passes the table information 1610 to the counting unit 400 as configuration information for analyzing the data 110; however, according to an example embodiment the counting unit 400 contains a predetermining configuration by which the data 110 is analyzed.

According to the example embodiment illustrated by FIG. 16, the table 402 contains the start offset and the end offset of the three intervals 301, 302, and 303. The start and end offsets correspond to beginning and ending bytes or byte locations of the respective intervals.

According to an example embodiment, the configuration unit 300 is configured to store the data populating the table 1650 and the table 1650 in a memory.

The counting unit 400 is configured to process the intervals designated by at least the configuration unit according to any of the previously described example embodiments.

Although the inventive concept has been described above with respect to the various example embodiments, it is noted that there can be a variety of permutations and modifications of the described features by those who are familiar with this field, without departing from the technical ideas and scope of the features, which shall be defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, one should not interpret that such specific order and/or arrangements are limited, or that all the operations performed and the components disclosed are needed to obtain a desired result. Accordingly, other implementations are within the scope of the following claims.

What is claimed is:

1. A network device, comprising:
   a packet ingress configured to receive data packets transmitted on a network;
   a plurality of counters, ones of the counters being configured to generate for corresponding one or more byte positions that are located in predetermined portions of the data packets, a count indicative of a number of occurrences in which bytes in the plurality of byte positions have a predetermined byte value; and
   a packet classifier configured to receive from the counters the counts of occurrences of the byte values and to classify data packets based on the counts.

2. The network device according to claim 1, wherein the packet classifier is further configured to apply a quality of service to the data packets based on the classification.

3. The network device according to claim 1, wherein the packet classifier is further configured to drop packets based on the classification.

4. The network device according to claim 1, wherein the packet classifier is further configured to classify the data packets in accordance with a determination whether the data packets are associated with an open systems interconnection (OSI) model layer 7 application.

5. The network device according to claim 1, wherein packet classifier is further configured to classify the data packets at contiguous and predetermined positions.

6. The network device according to claim 1, wherein each of the plurality of counters is further configured to count byte values at respectively different specified portions of each data packet, of the data packets, based on a reconfigurable configuration specifying a portion of interest in the data packet.

7. The network device according to claim 1, wherein the plurality of counters are hardware components that are configured to exactly count the occurrences of bytes having the respective byte values.

8. A method of operating a network device, comprising:
   receiving, at a network device, data packets transmitted on a network;
   generating with a plurality of counters, for corresponding one or more byte positions that are located in predetermined portions of the data packets, a count indicative of a number of occurrences in which bytes in the plurality of byte positions have a predetermined byte value;
   receiving from the counters, at a classifier, the counts of occurrences of the byte values; and
   classifying the data packets based on the counts.

9. The method of claim 8, further comprising, at the classifier, applying a quality of service to bytes based on the classification.

10. The method of claim 8, further comprising dropping packets, at the classifier, based on the classification.

11. The method of claim 8, wherein the classification by the packet classifier determines whether the data packets are associated with an open systems interconnection (OSI) model layer 7 application.

12. The method of claim 8, wherein the predetermined byte positions are set by the classifier such that at least one of the predetermined portions of the data packets is contiguous.

13. The method of claim 8, further comprising reconfiguring, by the plurality of counters, a range of byte locations of at least one of the predetermined portions to be counted from among the data packets.

14. The method of claim 8, wherein hardware components perform the counting of the occurrences of predetermined byte values in the plurality of byte positions.

* * * * *